US009612897B1

(12) United States Patent
Bernico et al.

(10) Patent No.: US 9,612,897 B1
(45) Date of Patent: Apr. 4, 2017

(54) METHOD AND SYSTEM FOR DETECTING SYSTEM OUTAGES USING APPLICATION EVENT LOGS

(71) Applicant: STATE FARM MUTUAL AUTOMOBILE INSURANCE COMPANY, Bloomington, IL (US)

(72) Inventors: Michael Bernico, Bloomington, IL (US); Brian Alexander, Bloomington, IL (US); Abigail A. Scott, Bloomington, IL (US); Andrew J. Rader, Indianapolis, IN (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 13 days.

(21) Appl. No.: 14/885,021

(22) Filed: Oct. 16, 2015

Related U.S. Application Data (60) Provisional application No. 62/090,992, filed on Dec. 12, 2014.

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0778* (2013.01)

(58) Field of Classification Search
USPC ......................................................... 714/26
See application file for complete search history.

(56) References Cited

U.S. PATENT DOCUMENTS

| 2008/0168308 | A1* | 7/2008 | Eberbach | G06F 11/008 714/26 |
| 2015/0140973 | A1* | 5/2015 | Turakhia | H04M 1/72519 455/414.1 |
| 2016/0085645 | A1* | 3/2016 | Buzzard | G06F 11/2017 714/6.21 |

OTHER PUBLICATIONS

Breiman et al., "Random Forests," University of California, Berkeley Department of Statistics, Oct. 2014, <https://www.stat.berkeley.edu/~breiman/RandomForests/cc_home.htm>.

* cited by examiner

*Primary Examiner* — Sarai Butler
(74) *Attorney, Agent, or Firm* — Marshall, Gerstein & Borun LLP; Randall G. Rueth (57) ABSTRACT

Methods, systems, apparatus, and non-transitory computer readable media are described for detecting system outages using application event logs. Various aspects may include obtaining several application event logs where the status of the system is known at the time the application event logs were recorded. Additionally, various aspects may include determining characteristics of application event logs which were recorded during a system outage, and/or determining characteristics of application event logs which were recorded while the system was available. Based upon the characteristics, various aspects include training using various machine learning techniques. When current application event logs are obtained where the status of the system is unknown at the time the current application event logs are recorded, various aspects include using the training data to determine a likelihood that a system outage has occurred based upon the obtained current application event logs.

20 Claims, 6 Drawing Sheets

| timestamp | logLevel | sourceClass | rootCauseClass | reporterClass | application | isOutage |
|---|---|---|---|---|---|---|
| 1410199198 | error | abc.xyz.warning | www.tuv | aaA.kln.ty | XXXXXv01 | 0 |
| 1410199185 | warn | | | aaA.kln.ty | XXXXXv01 | 0 |
| 1410199163 | error | abc.xyz.warning | www.tuv | aaA.kln.ty | XXXXXv2 | 1 |

METHOD AND SYSTEM FOR DETECTING SYSTEM OUTAGES USING APPLICATION EVENT LOGS

CROSS-REFERENCE TO RELATED APPLICATIONS

This application claims priority to and the benefit of the filing date of provisional U.S. Patent Application No. 62/090,992 entitled "Method And System For Detecting System Outages Using Application Event Logs," filed on Dec. 12, 2014, the entire contents of which is hereby expressly incorporated herein by reference.

TECHNICAL FIELD

The present disclosure generally relates to methods, systems, apparatus, and non-transitory computer readable media for predicting system availability and, more particularly to detecting system outages by analyzing application event logs using machine learning techniques.

BACKGROUND

Today, computing systems including network servers may experience failures or outages where the servers are unable to communicate with user devices. This may cause several problems, particularly in fields such as banking, e-commerce, health information systems, nuclear power, etc., where system availability may be crucial. To detect outages, system administrators may manually review application data, may receive complaints from customers after the system experiences an outage, and/or may create robot interactions with the system to simulate users.

However, in such systems millions or even billions of events may be logged each day, making manual review an extremely time-consuming, if not impossible task. Moreover, in many cases, the system may be unavailable for a lengthy period of time causing harm to the users before customer complaints are received. Robot interactions may also be time-consuming and difficult to create, which may result in errors or inaccuracies in system outage detection.

BRIEF SUMMARY

The present embodiments may relate to detecting system outages by analyzing application event logs using machine learning techniques. A server device may be trained to detect system outages by obtaining application event logs where the status of the system is known for the time that the application event logs were recorded. The server device may be trained using various machine learning techniques to identify characteristics in the application event logs which are indicative of a system outage and/or characteristics which are indicative of an available system.

When the server device receives application event logs in near real-time when the status of the system is unknown, the server device may apply the characteristics "learned" during the training period, to determine the likelihood that the near real-time application event logs are indicative of a system outage and/or of an available system.

In one aspect, a computer-implemented method for detecting system outages using application event logs may be provided. The method may include: during a training period, (1) obtaining (via one or more processors, and/or wired or wireless communication and/or data transmission) a first plurality of application event logs, wherein at least one of the first plurality of application event logs may correspond to a system outage, and wherein at least one of the first plurality of application event logs may not correspond to the system outage; (2) determining (via the one or more processors) one or more first characteristics of the at least one first application event log which may correspond to the system outage, and/or (3) determining (via the one or more processors) one or more second characteristics of the at least one first application event log which may not correspond to the system outage. The method may further include (4) obtaining (via one or more processors, and/or wired or wireless communication and/or data transmission) a second plurality of application event logs in near real-time, (5) comparing (via the one or more processors) one or more third characteristics of the second plurality of application event logs to at least one of: the one or more first characteristics of the at least one first application event log which may correspond to the system outage, and/or the one or more second characteristics of the at least one first application event log which may not correspond to the system outage and/or (6) determining (via the one or more processors) a likelihood that a system outage has occurred in near real-time based upon the comparison to decrease downtime in a computing system. The method may include additional, fewer, or alternative actions, including those discussed elsewhere herein.

In another aspect, a system for detecting system outages using application event logs may be provided. The system may include one or more processors and/or a non-transitory computer-readable memory coupled to the one or more processors and storing thereon instructions. When executed by the one or more processors, the instructions may cause the system to: during a training period, (1) obtain a first plurality of application event logs, wherein at least one of the first plurality of application event logs may correspond to a system outage, and wherein at least one of the first plurality of application event logs may not correspond to the system outage; (2) determine one or more first characteristics of the at least one first application event log which may correspond to the system outage; and/or (3) determine one or more second characteristics of the at least one first application event log which may not correspond to the system outage. The instructions further cause the system to (4) obtain a second plurality of application event logs in near real-time, (5) compare one or more third characteristics of the second plurality of application event logs to at least one of: the one or more first characteristics of the at least one first application event log which may correspond to the system outage, and/or the one or more second characteristics of the at least one first application event log which may not correspond to the system outage, and/or (6) determine a likelihood that a system outage has occurred in near real-time based upon the comparison to decrease downtime in a computing system. The system may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

To detect system outages in a computing system, a training module may receive several application event logs which may record events that occur in a system (e.g., an expired session due to user inactivity), and may group the application event logs into time intervals. For example, the training module may receive ten application event logs which each occur within a one minute time interval of between 4:31 p.m. and 4:32 p.m. on Aug. 13, 2014. For each time interval, the training module may generate an indication of whether there was a system outage. The indications may be included in the corresponding application event logs. The training module may then determine characteristics of the application event logs for time intervals which correspond to a system outage, as well as characteristics of the application event logs for time intervals which do not correspond to a system outage.

For example, the characteristics may be word frequencies of various words included in the application event logs (e.g., the word "error" may occur more often when there is a system outage than when the system is available). In some embodiments, the training module may determine characteristics of system outages and/or of an available system for all previously recorded application event logs.

A system outage assessment module may then receive current application event logs in near-real time to determine the likelihood that a system outage has occurred based upon the current application event logs and using information from the training module. For example, the system outage assessment module may determine characteristics of the current application event logs and/or may compare them with the characteristics of system outage application event logs and/or the characteristics of system available application event logs using various machine learning techniques (e.g., naïve Bayes, random decision forests, boosting, logistic regression, etc.).

Using the machine learning techniques, the system outage assessment module may determine the likelihood that a system outage has occurred and/or may cause the likelihood to be displayed on a user interface for a system administrator to review. In some embodiments, the current application event logs may then be received by the training module for additional training.

The present aspects advantageously may decrease downtime and/or the amount of time for detecting a computing system outage, and consequently may increase computing system availability. Moreover, the present aspects may advantageously increase processing speed within the computing system based upon the decrease in downtime.

Generally speaking, the techniques for detecting system outages may be implemented in one or more network servers, in one or more client devices, or a system that includes several of these devices. However, for clarity, the examples below focus primarily on an embodiment in which a server device obtains application event logs which may correspond to interactions between the server device and one or more client devices. The server device may determine which application event logs correspond to system outages and which application event logs correspond to an available system. The server device may then be trained using the application event logs to identify characteristics of the application event logs which may be useful for determining a likelihood of a system outage. For example, individual terms or words in the application event logs may become features or feature vectors for determining the likelihood of a system outage. Various machine learning techniques may be used to train the server device.

After the server device has been trained, current application event logs which may be received in real-time or at least near real-time may be obtained. The current application event logs may then be analyzed, for example, using the various machine learning techniques to determine a likelihood that a system outage has occurred.

I. Exemplary Environment for Outage Detection

Figure 1:
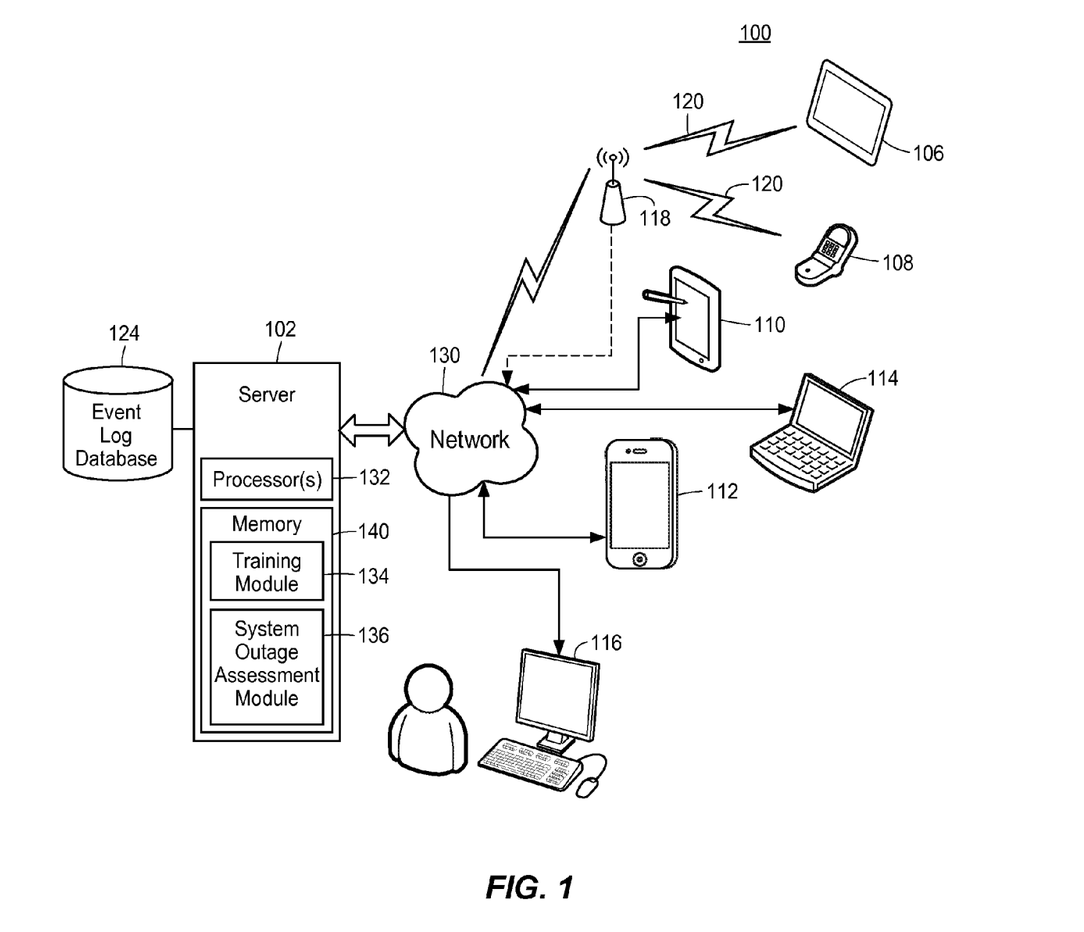
FIG. 1 illustrates a block diagram of a computer network and system on which an exemplary outage detection system may operate in accordance with an exemplary aspect of the present disclosure.

FIG. 1 illustrates various aspects of an exemplary environment implementing an outage detection system 100. The environment 100 may include a server device 102, and/or a plurality of client devices 106-116 which may be communicatively connected through a network 130, as described below. According to embodiments, the server device 102 may be a combination of hardware and software components, also as described in more detail below. The server device 102 may have an associated database 124 for storing application event log data related to the operation of the outage detection system 100. Moreover, the server device 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a training module 134 and a system outage assessment module 136. The server device 102 is described in more detail below with reference to FIG. 2A.

A. Exemplary Training Module

To detect system outages a training module 134 may obtain application event logs, for example, from the event log database 124, for one or several applications within the outage detection system 100. Applications may include, for example, mobile banking applications, social networking applications, insurance applications for making claims and/or for underwriting, etc. The training module 134 may determine which application event logs correspond to a system outage and which application event logs correspond to an available system, based upon whether there was a system outage at the time in which each application event log occurred.

Furthermore, the training module 134 may determine characteristics of the application event logs which correspond to a system outage (system outage application event logs) and/or characteristics of the application event logs which correspond to an available system (system available application event logs), such as word frequencies of various words within the application event logs. In a testing phase, the training module 134 may compare the characteristics of the system outage application event logs to the characteristics of the system available application event logs using various machine learning techniques. In this manner, the training module 134 may determine whether an application event log corresponds to a system outage or to an available system.

If the training module 134 makes the correct determination more frequently than a predetermined threshold amount, the characteristics of the system outage application event logs and/or the system available application event logs may be provided to a system outage assessment module 136. On the other hand, if the training module 134 does not make the correct determination more frequently than the predetermined threshold amount, the training module 134 may continue to obtain and analyze additional application event logs for further training.

B. Exemplary System Outage Assessment Module

The system outage assessment module 136 may obtain the characteristics of the system outage application event logs and/or the system available application event logs. Moreover, the system outage assessment module 136 may obtain current application event logs in near real-time for a predetermined time interval (e.g., for the last five minutes). The system outage assessment module 136 may then determine characteristics of the current application event logs (e.g., word frequencies) and compare them to the characteristics of the system outage application event logs and/or the characteristics of the system available application event logs using the various machine learning techniques. Based upon the comparison, the system outage assessment module 136 may determine a likelihood that a system outage has occurred, and/or may cause the likelihood to be displayed on a user interface for a system administrator to review. The likelihood may be represented as a probability (e.g., 0.6), a percentage (e.g., 80 percent), a category from a set of categories (e.g., "High," "Medium," or "Low"), and/or in any other suitable manner.

C. Exemplary Client Devices

The client devices 106-116 may include, by way of example, a tablet computer 106, a cell phone 108, a personal digital assistant (PDA) 110, a mobile device smart-phone 112 also referred to herein as a "mobile device," a laptop computer 114, a desktop computer 116, a portable media player (not shown), a home phone, a wearable computing device, smart glasses, smart watches, phablets, other smart devices, devices configured for wired or wireless RF (Radio Frequency) communication, etc. Of course, any client device appropriately configured may interact with the outage detection system 100. The client devices 106-116 need not necessarily communicate with the network 130 via a wired connection. In some instances, the client devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the client devices 106-116 may interact with the server device 102 to receive web pages and/or server data and may display the web pages and/or server data via a client application and/or an Internet browser (described below). For example, the mobile device 112 may display an application screen of a client application (e.g., a mobile banking application) and/or a web page to a user, may receive an input from the user, and/or may interact with the server device 102 depending on the type of user-specified input. Based upon the client interactions with the server device 102, the server device 102 may generate application event logs such as an informational message that the session has timed out due to user inactivity, an error message that there was an error accessing a file, etc.

It will be appreciated that although only one server device 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, etc.

The server device 102 may communicate with the client devices 106-116 via the network 130. The digital network 130 may be a proprietary network, a secure public Internet, a virtual private network and/or some other type of network, such as dedicated access lines, plain ordinary telephone lines, satellite links, combinations of these, etc. Where the digital network 130 comprises the Internet, data communication may take place over the digital network 130 via an Internet communication protocol.

II. Exemplary System Hardware

A. Exemplary Server Device

Figure 2A:
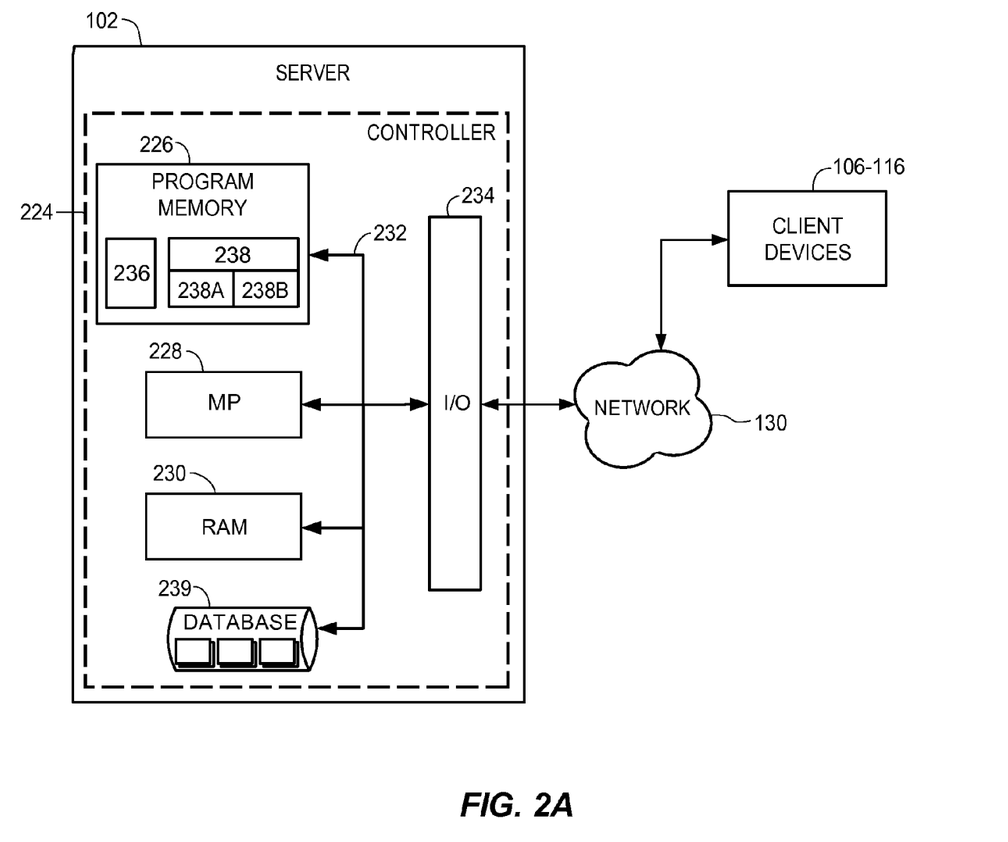
FIG. 2A illustrates a block diagram of an exemplary server device in accordance with an exemplary aspect of the present disclosure.

Turning now to FIG. 2A, the server device 102, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as application event logs, web page templates and/or web pages, and other data necessary to interact with users, and/or security administrators through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the server device 102, which user interface may, for example, allow the system administrator to configure, troubleshoot, and/or test various aspects of the server's operation including identifying system outages and displaying the likelihood of a system outage and/or a warning or alert. A server application 238 may operate to determine and/or transmit a likelihood of a system outage and/or a warning or alert to the client device 106-116 and/or to the user-interface application 236 for the system administrator to review. The server application 238 may be a single module 238 or a plurality of modules 238A, 238B such as the training module 134 and the system outage assessment module 136, respectively.

While the server application 238 is depicted in FIG. 2A as including two modules, 238A and 238B, the server application 238 may include any number of modules accomplishing tasks related to implantation of the server device 102.

B. Exemplary Computing Device

Figure 2B:
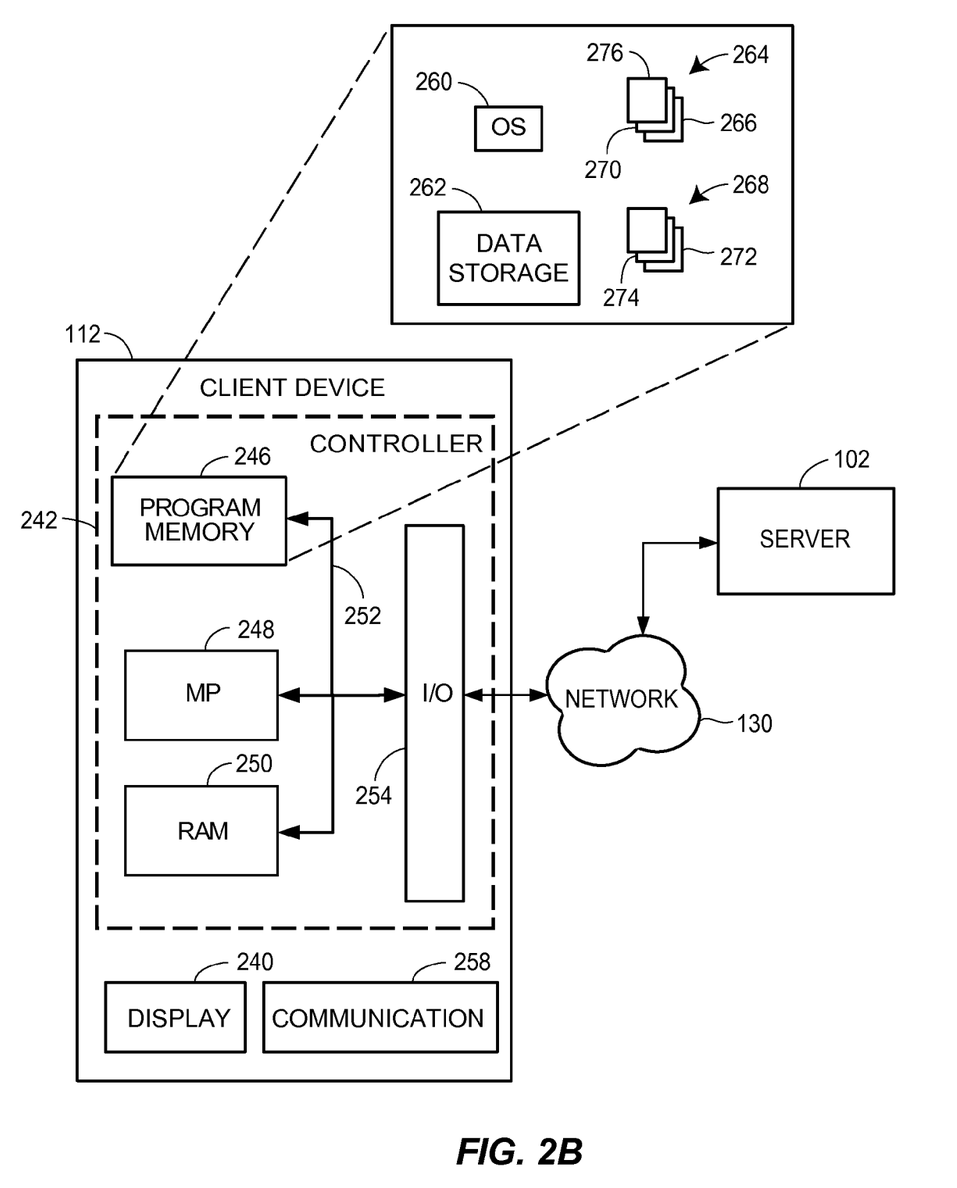
FIG. 2B illustrates a block diagram of an exemplary client device in accordance with an exemplary aspect of the present disclosure.

Referring now to FIG. 2B, the laptop computer 114 (or any of the client devices 106-116) may include a display 240, a communication unit 258, a user-input device (not shown), and, like the server device 102, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include Microsoft Windows®, OS X®, Linux®, Unix®, etc. The data storage 262 may include data such as user profiles, application data for the plurality of applications 264, routine data for the plurality of routines 268, and/or other data necessary to interact with the server device 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the laptop computer 114.

The communication unit 258 may communicate with the server device 102 via any suitable wireless communication protocol network, such as a wireless telephony network (e.g., GSM, CDMA, LTE, etc.), a wi-fi network (802.11 standards), a WiMAX network, a Bluetooth network, etc. The user-input device (not shown) may include a "soft" keyboard that is displayed on the display 240 of the laptop computer 114, an external hardware keyboard communicating via a wired or a wireless connection (e.g., a Bluetooth keyboard), an external mouse, or any other suitable user-input device. As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the laptop computer 114.

One of the plurality of applications 264 may be a native application and/or web browser 270, such as Apple's Safari®, Google Chrome™, Microsoft Internet Explorer®, and Mozilla Firefox™ that may be implemented as a series of machine-readable instructions for receiving, interpreting, and/or displaying web page information from the server device 102 while also receiving inputs from the user. Another application of the plurality of applications may include an embedded web browser 276 that may be implemented as a series of machine-readable instructions for receiving, interpreting, and/or displaying web page information from the server device 102. One of the plurality of routines may include an outage likelihood display routine 272 which obtains the likelihood of a system outage from the server device 102 and displays the likelihood on the user interface 240. Another routine in the plurality of routines may include an open application routine 274 that receives user-input instructing the laptop computer 114 to open an application which includes data stored on the server device 102 (e.g., a banking application) and/or transmits a request for application data to the server device 102 in response to the user-input.

Preferably, a system administrator may launch the client application 266 from a client device, such as one of the client devices 106-116, to communicate with the server device 102 to implement the outage detection system 100. Additionally, the system administrator may also launch or instantiate any other suitable user interface application (e.g., the native application or web browser 270, or any other one of the plurality of software applications 264) to access the server device 102 to realize the outage detection system 100.

III. Exemplary Application Event Logs

Figure 3:
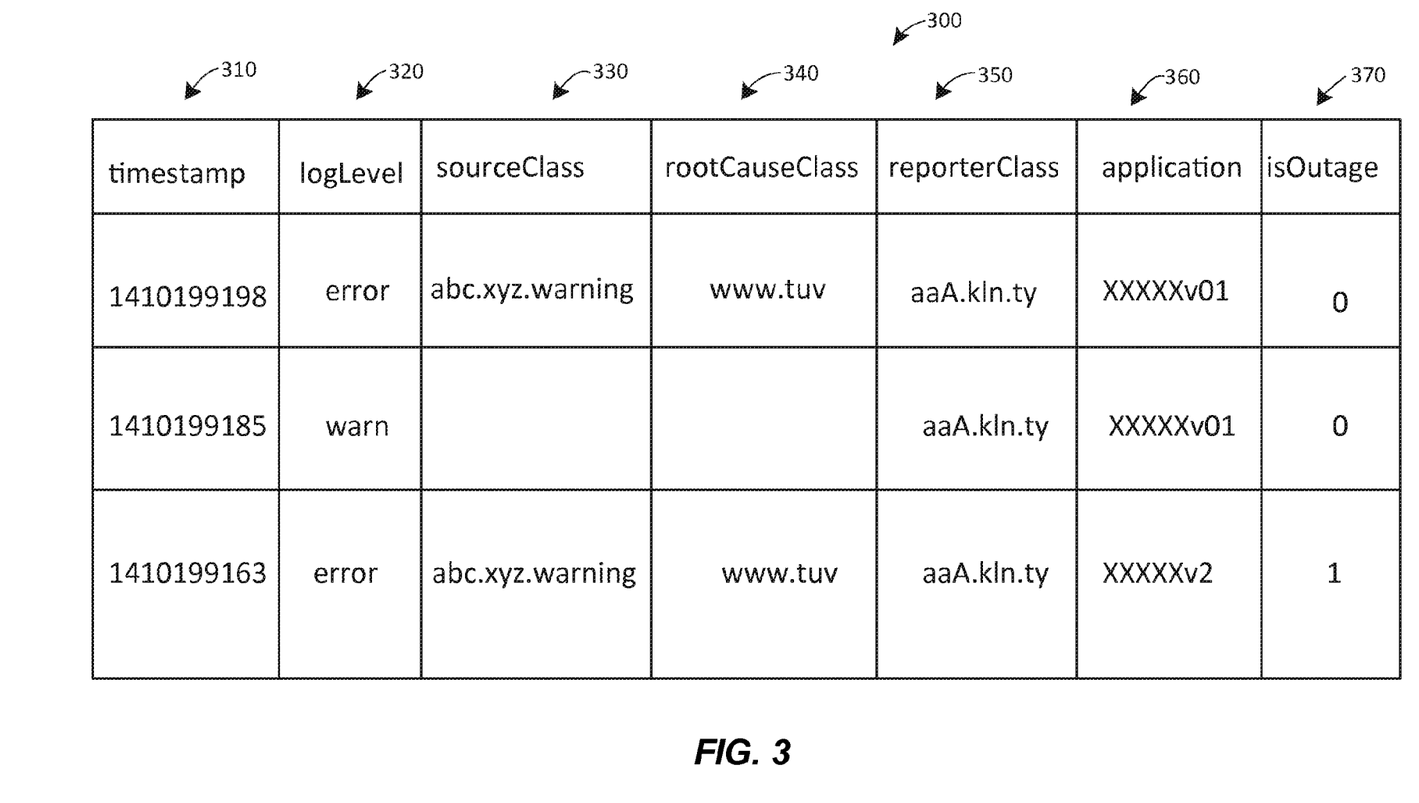
FIG. 3 depicts exemplary application event logs in a data format generated to detect system outages in accordance with an exemplary aspect of the present disclosure.

FIG. 3 depicts exemplary application event logs 300 in a converted format for identifying system outages. The training module 134 may transform the application event logs from a "raw" format (e.g., an XML format) to a format which includes information specifically for identifying system outages. For example, only certain attributes within the "raw" application event logs may be included, such as the time in which the event occurred, the type of application event log (e.g., warning message, error message, and/or informational message), the application in which the event occurred, the application component that first encountered the event that has occurred, the application component which recorded the event, the type of issue that the application encountered when the event occurred, etc. Moreover, in some embodiments, additional and/or alternative attributes of the "raw" application event logs may be included and/or some of the attributes mentioned above may be omitted.

The exemplary application event logs 300 may include a timestamp attribute 310, a log level attribute 320, a source class attribute 330, a root cause class attribute 340, a reporter class attribute 350, an application attribute 360, and/or an isOutage attribute 370. The timestamp attribute 310 may indicate the date/time when the event occurred. The timestamp may be represented in Unix time or in any other suitable manner. The log level 320 may indicate the type of the event that occurred, for example, a warning, an error, an informational message, etc. The source class 330 may indicate the application component which logged the event. In some embodiments, a source class may be present for errors only. The root cause class 340 may indicate the type of issue that the application encountered when the event occurred. In some embodiments, the root cause class may be present for errors only. Additionally, the reporter class 350 may indicate the application component which recorded the event. Furthermore, the application column 360 may indicate the application in which the event occurred. In addition to the name of the application, the application column 360 may indicate the version of the application.

Moreover, the isOutage column 370 may indicate whether there was a system outage at the time the event occurred corresponding to the application event log. The isOutage attribute may be represented by a "Yes" or a "No," a "1" or "0," a "True" or "False," or in any other suitable manner which indicates whether or not a system outage occurred. The isOutage attribute may not be transformed from the "raw" application event logs and may instead be determined by a user and/or by the system and entered into the transformed application event logs 300 for training purposes.

By including the isOutage attribute in the transformed application event logs 300 the training module may determine differences between system outage application event logs and system available application event logs. The differences may be analyzed to determine a likelihood that a system outage occurs based upon near real-time application event logs for which the status of the system is unknown.

Each of the attributes for the application event logs 300 may be represented by alphanumeric text characters. In this manner, the training module 134 may determine which alphanumeric characters and/or words may be most likely to be present in a system outage application event log and which alphanumeric characters and/or words may be most likely to be present in a system available application event log.

The system outage assessment module 136 may then determine word frequencies for the near real-time application event logs for which the status of the system is unknown. If the near real-time application event logs contain words which are likely to be indicative of a system outage according to the training module 134, the system outage assessment module 136 may determine that there is a high likelihood of a system outage. This is described in more detail below with respect to FIG. 4.

While the exemplary applications logs 300 include three application event logs, this is merely for ease of illustration only. There may be hundreds, thousands, millions, billions, and/or any other suitable number of application event logs in the outage detection system 100. Moreover, the application event logs may include additional or alternative attributes and/or may omit one or more of the attributes included in the exemplary application event logs 300.

IV. Exemplary Block Diagram of a Training Module

Figure 4:
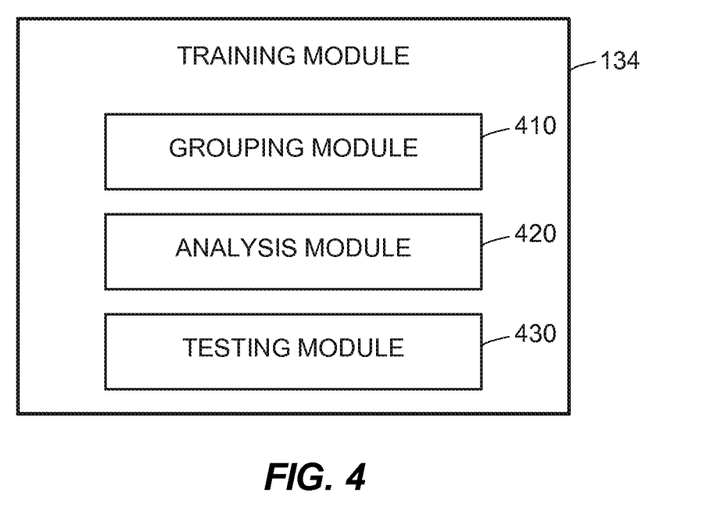
FIG. 4 depicts an exemplary training module in accordance with an exemplary aspect of the present disclosure.

FIG. 4 is an exemplary block diagram of a training module 134. The training module 134 may include a grouping module 410, an analysis module 420, and/or a testing module 430. The training module 134 may obtain "raw" application event logs and transform them as described above.

The grouping module 410 may then group the converted application event logs into specified time interval blocks (e.g., one minute time interval blocks), so that all application event logs within a given time interval are grouped together. For example, based upon the time attribute, the grouping module 410 may assign 15 application event logs which occurred between 1:20 and 1:21 p.m. on Aug. 15, 2014 to a 1:20 p.m. time interval block.

The grouping module 410 may repeat this process until each application event log is assigned to a time interval block based upon the respective timestamp for the application event log. In some embodiments, each time interval block may receive an indication of whether there was a system outage within the time interval. If there was a system outage, each application event log within the time interval block may have an isOutage attribute of "1," "Yes," "True," etc. On the other hand, if there was not a system outage, each application event log within the time interval block may have an isOutage attribute of "0," "No," "False," etc.

The analysis module 420 may then receive each time interval block of application event logs and determine characteristics of the time interval blocks. For example, the analysis module 420 may determine word frequencies of words or terms within a time interval block and/or may determine a term frequency-inverse document frequency (tf-idf) which indicates a level of importance of words or terms in a block. The tf-idf may be calculated as a combination of the term frequency and the inverse document frequency of a word or term in a block.

The term frequency may be a number of times that a particular word or term is present in a given block. Moreover, the inverse document frequency may be based upon how likely a word is to be present in any of the blocks. The more likely the word is to be present in any of the blocks, the less important the word is to a given block and as a result, the inverse document frequency for the word may be low. For example, the word "the" may be present in every block and as a result may have a very low inverse document frequency leading to a low tf-idf. On the other hand, uncommon words or terms which have a high term frequency in a given block may have a high tf-idf for that particular block.

The inverse document frequency may be calculated as the logarithm of the total number of blocks divided by the number of blocks which include the word or term. In other embodiments, the inverse document frequency may be calculated in any other suitable manner. The term frequency may then be multiplied by the inverse document frequency to calculate the tf-idf for a word or term in a given block.

The analysis module 420 may determine word frequencies, tf-idfs, or any other suitable characteristic for each of the terms or words in the time interval blocks of application event logs. Furthermore, the analysis module 420 may perform a statistical analysis on the tf-idfs for terms in system outage time interval blocks and/or terms in system available time interval blocks to generate training data. The statistical analysis may be performed according to various machine learning techniques, such as naïve Bayes, random decision forests, boosting, logistic regression, etc. For example, the analysis module 420 may determine the mean tf-idf, the standard deviation tf-idf, a probability distribution of the tf-idfs, etc., for the term "xyz" in system outage time interval blocks.

The training data may be provided to the testing module 430 which may utilize the training data to determine the likelihood that a time interval block of "test" application event logs may correspond to a system outage. The "test" application event logs may be application event logs received at times when the status of the system is known. However, for purposes of testing, the testing module 430 may determine the likelihood of a system outage by comparing word frequencies and/or tf-idfs of words in the "test" application event logs to word frequencies and/or tf-idfs of words in the training data generated by the analysis module 420. The likelihood determined by the testing module 430 may then be compared to the known system status.

In some embodiments, if the likelihood of a system outage is over 0.5 and the known status is a system outage, the determination may be deemed correct. In other embodiments, the likelihood may have to be above 0.7 when the known status is a system outage, or some other predetermined threshold for the determined likelihood to be deemed correct.

Moreover, in some embodiments, when the testing module 430 is correct more than a predetermined threshold amount of the time, the training data may be provided to the system outage assessment module 136 to determine the likelihood of a system outage when the status of the system is unknown. On the other hand, if the testing module 430 is not correct more than the threshold amount, the training module 134 may continue obtaining application event logs from when the status of the system is known for further training.

The testing module 430 may determine the likelihood of a system outage using the various machine learning techniques. For example, the testing module 430 may determine the tf-idf for each word or term in the "test" application event logs. The tf-idf for a term in the "test" application event logs may be compared to the training data for the same term in system outage time interval blocks. Based upon the comparison, the testing module 430 may determine a probability that the term is in a system outage application event log. For example, if the tf-idf for the term in the "test" application event logs is very close to the average tf-idf for the term in system outage time interval blocks, it may be likely that the term is in a system outage application event log.

The probabilities for each term in the "test" application event logs may be aggregated, combined, scaled, etc., to determine an overall probability that the "test" application event logs are in a system outage time interval block. In some embodiments, the probability may be scaled for words or terms with tf-idfs above a certain threshold based upon the level of importance of the terms in their respective time interval blocks.

Furthermore, in some embodiments, the testing module 430 may also determine a probability that the "test" application event logs are in a system available time interval block. The probabilities may be compared to determine the likelihood of a system outage. For example, the testing module 430 may calculate a probability ratio of the probability that the "test" application event logs are in a system outage time interval block compared to the probability that the "test" application event logs are in a system available time interval block.

V. Exemplary System Outage Assessment Module Block Diagram

Figure 5:
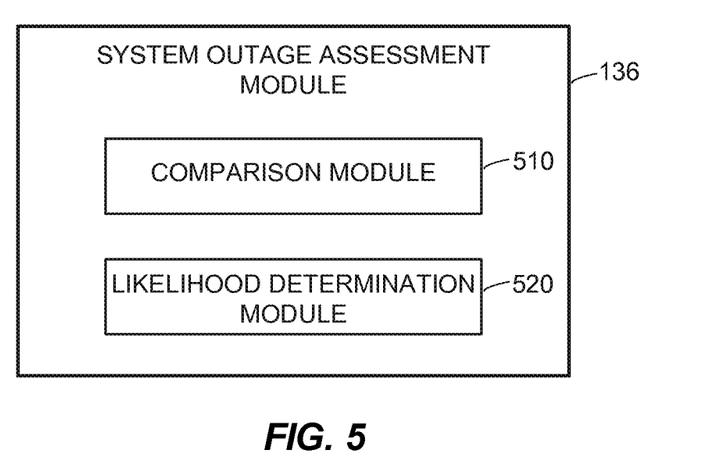
FIG. 5 depicts an exemplary system outage assessment module in accordance with an exemplary aspect of the present disclosure.

Once the training data has been adequately tested to verify its accuracy, the system outage assessment module 136 may obtain the training data. FIG. 5 is an exemplary block diagram of a system outage assessment module 136. The system outage assessment module 136 may include a comparison module 510 and/or a likelihood determination module 520. The comparison module 510 may obtain current application event logs in near real-time when the status of the system is unknown. The current application event logs may be obtained over a predetermined time interval (e.g., five minutes). Then the comparison module 510 may compare word frequencies and/or tf-idfs of words in the current application event logs to the training data generated by the analysis module 420.

The comparison module 510 may compare word frequencies and/or tf-idfs of terms using the various machine learning techniques. For example, the comparison module 510 may determine the tf-idf for each word or term in the current application event logs. The tf-idf for a term in the current application event logs may be compared to the training data for the same term in system outage time interval blocks. Based upon the comparison, the comparison module 510 may determine a probability that the term is in a system outage application event log. For example, if the tf-idf for the term in the current application event logs is very close to the average tf-idf for the term in system outage time interval blocks, it may be likely that the term is in a system outage application event log.

The probabilities for each term in the current application event logs may be aggregated, combined, scaled, etc., to determine an overall probability that the current application event logs are in a system outage time interval block. In some embodiments, the probability may be scaled for words or terms with tf-idfs above a certain threshold based upon the level of importance of the terms in their respective time interval blocks. Furthermore, in some embodiments, the comparison module 510 may also determine a probability that the current application event logs are in a system available time interval block.

The likelihood determination module 520 may receive the probability that the current application event logs are in a system outage time interval block and/or the probability that the current application event logs are in a system available time interval block In some embodiments, the likelihood determination module 520 may then compare the probabilities and/or determine a likelihood that the current event logs are in a system outage time interval block based upon the difference between the probabilities. For example, if there is a large difference between the two probabilities, the likelihood may approach zero or one, whereas if the difference between the two probabilities is very close, the likelihood may be 0.5. In some embodiments, the likelihood determination module 520 may calculate a probability ratio of the probability that the current application event logs are in a system outage time interval block compared to the probability that the current application event logs are in a system available time interval block. The likelihood may be represented as a probability (e.g., 0.6), a percentage (e.g., 80 percent), a category from a set of categories (e.g., "High," "Medium," or "Low"), or in any other suitable manner.

The likelihood determination module 520 may cause the likelihood of a system outage to be displayed on a user interface of the server device 102 and/or on the client devices 106-116 for a system administrator to review. Moreover, when the likelihood of a system outage is above a predetermined threshold likelihood (e.g., 0.7), a warning and/or alert may be displayed on the user interface of the server device 102 and/or the client device 106-116. For example, when the likelihood is above the predetermined threshold likelihood, the system administrator may receive an email, short message service (SMS) text message, push notification, or any other suitable alert/notification that there is a high likelihood of a system outage. In some embodiments, when the likelihood is the predetermined threshold likelihood, the outage detection system 100 may automatically begin a reboot process, may automatically perform further testing to identify the cause of the system outage (e.g., based upon the root causes of errors in the current application event logs), and/or may begin any other suitable type of self-healing process.

When the status of the system becomes known, the isOutage attribute of the current application event logs may be updated accordingly. The training module 134 may then obtain the current application event logs for further training.

VI. Exemplary Flow Diagram for Outage Detection

Figure 6:
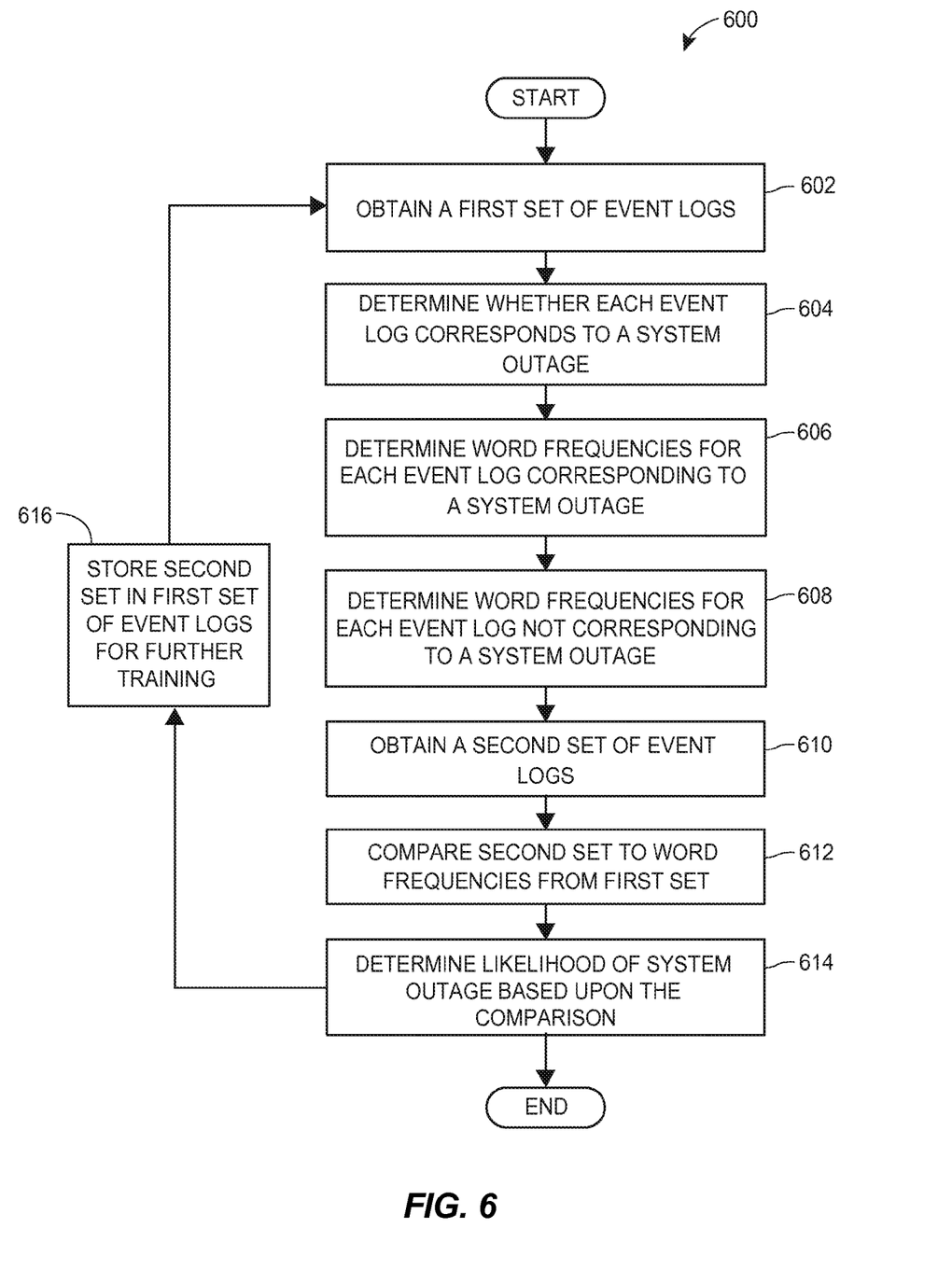
FIG. 6 depicts a flow diagram representing an exemplary server-side method for implementing the outage detection system in accordance with an exemplary aspect of the present disclosure.

FIG. 6 depicts a flow diagram representing an exemplary method 600 for determining a likelihood of a system outage. The method 600 may be executed on the server device 102. In some embodiments, the method 600 may be implemented in a set of instructions stored on a non-transitory computer-readable memory and executable on one or more processors of the server device 102. For example, the method 600 may be performed by the training module 134 and/or the system outage assessment module 136 of FIG. 1.

At block 602, the training module 134 may obtain "raw" application event logs and transform the "raw" application event logs to a format which includes information specifically for identifying system outages. For example, the training module 134 may assign each of the application event logs to a time interval block, and determine, for each time interval block, whether there was a system outage within the corresponding time interval (block 604). Each application event log may obtain an isOutage attribute based upon whether there was a system outage at the time of the corresponding time interval block.

The training module 134 may also determine word frequencies and/or tf-idfs for each term in the system outage time interval blocks (block 606) and/or for each term in the system available time interval blocks (block 608). The training module 134 may perform further analysis on the word frequencies and/or tf-idfs such as a statistical analysis to generate training data, and/or may conduct a test process where word frequencies from "test" application event logs may be compared to the training data using various machine learning techniques to determine a likelihood that a system outage occurred at the time the "test" application event logs were recorded.

When the test process is completed to verify the accuracy of the training data, the system outage assessment module 136 may receive current application event logs in near real-time (block 610). Word frequencies and/or tf-idfs for the current application event logs may be determined and/or compared to the training data using the various machine learning techniques (block 612). For example, the tf-idf may be determined for each word or term in the current application event logs. The tf-idf for a term in the current application event logs may be compared to the training data for the same term in system outage time interval blocks.

Based upon the comparison, a likelihood that a system outage has occurred at the time the current application event logs are recorded may be determined (block 614). The likelihood may be represented as a probability (e.g., 0.6), a percentage (e.g., 80 percent), a category from a set of categories (e.g., "High," "Medium," or "Low"), or in any other suitable manner and/or may be displayed on the user interface of the server device 102 and/or the client device 106-116. Moreover, when the likelihood of a system outage is above a predetermined threshold likelihood (e.g., 0.7), a warning and/or alert may be displayed on the user interface of the server device 102 and/or the client device 106-116. For example, when the likelihood is above the predetermined threshold likelihood, the system administrator may receive an email, short message service (SMS) text message, push notification, or any other suitable alert/notification that there is a high likelihood of a system outage.

In some embodiments, when the likelihood is above the predetermined threshold likelihood, the outage detection system 100 may automatically begin a reboot process, may automatically perform further testing to identify the cause of the system outage, and/or may begin any other suitable type of self-healing process. Furthermore, the current application event logs may be obtained by the training module 134 for further training (block 616). The method may include additional, fewer, or alternative actions, including those discussed elsewhere herein.

VII. Exemplary Method for Outage Detection

In one aspect, a computer-implemented method detecting system outages using application event logs may be provided. The method may include: during a training period, (1) obtaining (via one or more processors, and/or wired or wireless communication and/or data transmission) a first plurality of application event logs, wherein at least one of the first plurality of application event logs may correspond to a system outage, and wherein at least one of the first plurality of application event logs may not correspond to the system outage; (2) determining (via the one or more processors) one or more first characteristics of the at least one first application event log which may correspond to the system outage; and/or (3) determining (via the one or more processors) one or more second characteristics of the at least one first application event log which may not correspond to the system outage. The method may further include: (4) obtaining (via one or more processors, and/or wired or wireless communication and/or data transmission) a second plurality of application event logs in near real-time; (5) comparing (via the one or more processors) one or more third characteristics of the second plurality of application event logs to at least one of: the one or more first characteristics of the at least one first application event log which corresponds to the system outage, or the one or more second characteristics of the at least one first application event log which does not correspond to the system outage; and/or (6) determining (via the one or more processors) a likelihood that a system outage has occurred in near real-time based upon the comparison to decrease downtime in a computing system. Each of the first plurality of application event logs may include an indication of a time in which the first application event log is generated, and the method may include grouping (via the one or more processors) each of the first plurality of application event logs into one of a plurality of time intervals based upon the time in which the first application event log is generated; and/or for each time interval corresponding to a subset of the first plurality of application event logs, determining (via the one or more processors) whether the time interval may correspond to a system outage. The method may also include causing (via one or more processors, and/or wired or wireless communication and/or data transmission) an indication of the likelihood that the system outage has occurred to be displayed on a user interface of a computing device. Furthermore, the method may include determining (via the one or more processors) whether the second plurality of application event logs correspond to the system outage; and/or grouping (via the one or more processors) each of the second plurality of application event logs into one of the plurality of time intervals during the training period. The method may include additional, fewer, or alternate actions, including those discussed elsewhere herein.

For instance, the act of determining a likelihood that a system outage has occurred may include determining (via the one or more processors) the likelihood that the system outage has occurred based upon the second plurality of application event logs using one or more machine learning techniques.

Each of the first and second plurality of application event logs may include at least one of: a warning message, an informational message, or an error message. The one or more machine learning techniques may include at least one of: naïve Bayes, logistic regression, random decision forests, or boosting.

The one or more third characteristics may correspond to a frequency in which a word occurs in the second plurality of application logs. The first and second application event logs may be raw application events logs in a first data format, and the method may further include for each of the first and second application event logs, transforming the raw application event log into a second data format including at least some information from the raw application event log. The second data format may include an indication of whether the raw application event log corresponds to the system outage.

VIII. Exemplary System for Outage Detection

In another aspect, a system for detecting system outages using application event logs, may be provided. The system may include a communication network, one or more processors communicatively coupled to the communication network, and/or a non-transitory, tangible computer-readable memory coupled to the one or more processors and storing machine readable instructions, that when executed by the one or more processors, may cause the system to perform various tasks. For example, the instructions may cause the system to: during a training period, (1) obtain a first plurality of application event logs, wherein at least one of the first plurality of application event logs may correspond to a system outage, and wherein at least one of the first plurality of application event logs may not correspond to the system outage; (2) determine one or more first characteristics of the at least one first application event log which may correspond to the system outage; and/or (3) determine one or more second characteristics of the at least one first application event log which may not correspond to the system outage. The instructions may also cause the system to: (4) obtain a second plurality of application event logs in near real-time; (5) compare one or more third characteristics of the second plurality of application event logs to at least one of: the one or more first characteristics of the at least one first application event log which corresponds to the system outage, or the one or more second characteristics of the at least one first application event log which does not correspond to the system outage; and/or (6) determine a likelihood that a system outage has occurred in near real-time based upon the comparison to decrease downtime in a computing system. The system may include additional, fewer, or alternate components and/or functionality, including that discussed elsewhere herein.

For instance, each of the first plurality of application event logs may include an indication of a time in which the first application event log is generated, and the instructions may cause the system to group each of the first plurality of application event logs into one of a plurality of time intervals based upon the time in which the first application event log is generated; and/or for each time interval corresponding to a subset of the first plurality of application event logs, determine whether the time interval may correspond to a system outage. The system may also include a user interface and the instructions may further cause the system to cause an indication of the likelihood that the system outage has occurred to be displayed on the user interface. Moreover, the instructions may cause the system to determine whether the second plurality of application event logs may correspond to the system outage; and/or group each of the second plurality of application event logs into one of the plurality of time intervals during the training period.

To determine a likelihood that a system outage has occurred, the instructions may cause the system to determine the likelihood that the system outage has occurred based upon the second plurality of application event logs using one or more machine learning techniques.

Each of the first and second plurality of application event logs may include at least one of: a warning message, an informational message, or an error message. The one or more machine learning techniques may include at least one of: naïve Bayes, logistic regression, random decision forests, or boosting.

The one or more third characteristics may correspond to a frequency in which a word occurs in the second plurality of application logs. The first and second application event logs may be raw application events logs in a first data format, and the instructions may further cause the system to, for each of the first and second application event logs, transform the raw application event log into a second data format including at least some information from the raw application event log. The second data format may include an indication of whether the raw application event log corresponds to the system outage.

IX. Additional Exemplary Methods

In one aspect, a computer-implemented method for detecting system outages using application event logs may be provided. The method may be executed by one or more processors programmed to perform the method. The method may include obtaining, by the one or more processors, a plurality of application event logs in near real-time; and comparing, by the one or more processors, one or more characteristics of the plurality of application event logs to at least one of: (1) one or more first characteristics of a first application event log (stored in a memory unit or data structure) that corresponds to a previous system outage, or (2) one or more second characteristics of a second application event log (stored in a memory unit or data structure) that does not correspond to the previous system outage; and determining, by the one or more processors, a likelihood that a system outage has occurred in near real-time based upon the comparison to decrease downtime in a computing system, such as via automatic corrective actions and/or sending wired or wireless notifications to a system administrator. The method may further include, during a training period: obtaining, by one or more processors (such as via data transmission), multiple application event logs, including those that correspond and do not correspond to the previous system outage; determining, by the one or more processors, the one or more first characteristics of the first application event log that corresponds to the system outage; determining, by the one or more processors, the one or more second characteristics of the second application event log that does not correspond to the system outage; and storing the first and second application log events and/or the one or more first and second characteristics in a memory unit or data structure for subsequent retrieval and analysis by the one or more processors. The one or more first and second characteristics indicative of whether or not another system outage will occur in the future, respectively, may be determined and/or based upon individual terms or specific words in an application event log that is associated with the previous system outage. The method may include additional, fewer, or alternate actions, including those discussed elsewhere herein.

In one aspect, a computer-implemented method for detecting system outages using application event logs may be provided. The method may include, during a training period, by one or more processors, (a) obtaining multiple application event logs, wherein a first application event log from the among the multiple application event logs corresponds to a system outage, and a second application event log from among the multiple application event logs does not correspond to the system outage, (b) determining a first set of characteristics for the first application event log that corresponds to the system outage, and (c) determining a second set of characteristics for the second application event log that does not correspond to the system outage. After the training period, the method may include, by the one or more processors, (1) obtaining a plurality of application event logs in near real-time; (2) comparing one or more characteristics of the plurality of application event logs to at least one of: (i) the first set of characteristics of the first application event log that corresponds to the system outage, and/or (ii) the second set of characteristics of the second application event log that does not correspond to the system outage; and (3) determining a likelihood that a system outage has occurred in near real-time based upon the comparison to decrease downtime in a computing system, such as by automatic notifications transmitted to a system administrator via wired or wireless communication or other data transmission, and/or other automatic corrective actions accomplished under the direction and control of the one or more processors (e.g., start backup applications, processors, servers, etc.). The method may include additional, fewer, or alternate actions, including those discussed elsewhere herein.

X. Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_________' is hereby defined to mean . . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. The patent claims at the end of this patent application are not intended to be construed under 35 U.S.C. §112(f) unless traditional means-plus-function language is expressly recited, such as "means for" or "step for" language being explicitly recited in the claim(s).

Accordingly, the term "application event log," as used herein, may be used to refer to a record of user and system actions that have occurred for a particular computer program or component of a computer program. An application event log may include a date and time in which the event occurs, an application corresponding to the event, a component of the application which records the event, etc.

As used herein, the term "system outage" may be used to refer to a period when a computing system is unavailable for interaction with a user computing device. For example system outages may include equipment failures, power failures, high bit error rates, software bugs, failures to connect to telecommunications networks, communications channel bandwidth overloads, etc.

The term "real-time" as used herein, may be used to refer to information delivered within a predetermined amount of time after it is collected (e.g., seconds, minutes, hours, etc.). For example, an application event log which is analyzed to determine whether a system outage has occurred within a short period of time after it is recorded may be referred to herein as a "real-time application event log." The term "near real-time" as used herein, may be used to refer to information delivered within a predetermined amount of time after real-time. For example, an application event log may be analyzed in "near real-time" when there is a processing delay between the time the application event log is recorded and the time the application event log is analyzed (e.g., one minute, five minutes, twenty minutes, an hour, etc.).

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may implement numerous alternate embodiments, using either current technology or technology developed after the filing date of this application.

We claim:

1. A computer-implemented method for detecting system outages using application event logs, the method executed by one or more processors programmed to perform the method, the method comprising:

during a training period:
obtaining, by one or more processors, a first plurality of application event logs, wherein at least one of the first plurality of application event logs corresponds to a system outage, and wherein at least one of the first plurality of application event logs does not correspond to the system outage, determining, by the one or more processors, one or more first characteristics of the at least one first application event log which corresponds to the system outage, and determining, by the one or more processors, one or more second characteristics of the at least one first application event log which does not correspond to the system outage, obtaining, by the one or more processors, a second plurality of application event logs in near real-time;

comparing, by the one or more processors, one or more third characteristics of the second plurality of application event logs to at least one of: the one or more first characteristics of the at least one first application event log which corresponds to the system outage, or the one or more second characteristics of the at least one first application event log which does not correspond to the system outage; and determining, by the one or more processors, a likelihood that a system outage has occurred in near real-time based upon the comparison to decrease downtime in a computing system.

2. The computer-implemented method of claim 1, wherein each of the first plurality of application event logs includes an indication of a time in which the first application event log is generated, and further comprising:
grouping, by the one or more processors, each of the first plurality of application event logs into one of a plurality of time intervals based upon the time in which the first application event log is generated, and for each time interval corresponding to a subset of the first plurality of application event logs, determining, by the one or more processors, whether the time interval corresponds to a system outage.

3. The computer-implemented method of claim 1, wherein each of the first and second plurality of application event logs includes at least one of: a warning message, an informational message, or an error message.

4. The computer-implemented method of claim 1, wherein determining a likelihood that a system outage has occurred comprises determining, by the one or more processors, the likelihood that the system outage has occurred based upon the comparison using one or more machine learning techniques.

5. The computer-implemented method of claim 4, wherein the one or more machine learning techniques include at least one of: naïve Bayes classifiers, logistic regression, random decision forests, or boosting.

6. The computer-implemented method of claim 1, further comprising causing, by the one or more processors, an indication of the likelihood that the system outage has occurred to be displayed on a user interface of a computing device.

7. The computer-implemented method of claim 1, wherein the one or more third characteristics corresponds to a frequency in which a word occurs in the second plurality of application logs.

8. The computer-implemented method of claim 2, further comprising determining whether the second plurality of application event logs correspond to the system outage; and grouping, by the one or more processors, each of the second plurality of application event logs into one of the plurality of time intervals during the training period.

9. The computer-implemented method of claim 1, wherein the first and second application event logs are raw application events logs in a first data format and further comprising:
for each of the first and second application event logs, transforming the raw application event log into a second data format including at least some information from the raw application event log.

10. The computer-implemented method of claim 9, wherein the second data format includes an indication of whether the raw application event log corresponds to the system outage.

11. A system for detecting system outages using application event logs, the system comprising:
one or more processors; and
a non-transitory computer-readable memory coupled to the one or more processors and storing thereon instructions that, when executed by the one or more processors, cause the system to:
during a training period:
obtain a first plurality of application event logs, wherein at least one of the first plurality of application event logs corresponds to a system outage, and wherein at least one of the first plurality of application event logs does not correspond to the system outage, determine one or more first characteristics of the at least one first application event log which corresponds to the system outage, and determine one or more second characteristics of the at least one first application event log which does not correspond to the system outage, obtain a second plurality of application event logs in near real-time, compare one or more third characteristics of the second plurality of application event logs to at least one of: the one or more first characteristics of the at least one first application event log which corresponds to the system outage, or the one or more second characteristics of the at least one first application event log which does not correspond to the system outage, and determine a likelihood that a system outage has occurred in near real-time based upon the comparison to decrease downtime in a computing system.

12. The system of claim 11, wherein each of the first plurality of application event logs includes an indication of a time in which the first application event log is generated, and the instructions further cause the system to:
group each of the first plurality of application event logs into one of a plurality of time intervals based upon the time in which the first application event log is generated, and for each time interval corresponding to a subset of the first plurality of application event logs, determine whether the time interval corresponds to a system outage.

13. The system of claim 11, wherein each of the first and second plurality of application event logs includes at least one of: a warning message, an informational message, or an error message.

14. The system of claim 11, wherein to determine a likelihood that a system outage has occurred, the instructions cause the system to determine the likelihood that the system outage has occurred based upon the comparison using one or more machine learning techniques.

15. The system of claim 14, wherein the one or more machine learning techniques include at least one of: naïve Bayes classifiers, logistic regression, random decision forests, or boosting.

16. The system of claim 11, further comprising a user interface, and wherein the instructions further cause the system to: cause an indication of the likelihood that the system outage has occurred to be displayed on the user interface.

17. The system of claim 11, wherein the one or more third characteristics corresponds to a frequency in which a word occurs in the second plurality of application logs.

18. The system of claim 12, wherein the instructions further cause the system to:
    determine whether the second plurality of application event logs correspond to the system outage; and
    group each of the second plurality of application event logs into one of the plurality of time intervals during the training period.

19. A computer-implemented method for detecting system outages using application event logs, the method executed by one or more processors programmed to perform the method, the method comprising:
    obtaining, by one or more processors, a plurality of application event logs in near real-time;
    comparing, by the one or more processors, one or more characteristics of the plurality of application event logs to at least one of: (1) one or more first characteristics of a first application event log that corresponds to a previous system outage, or (2) one or more second characteristics of a second application event log that does not correspond to the previous system outage; and
    determining, by the one or more processors, a likelihood that a system outage has occurred in near real-time based upon the comparison to decrease downtime in a computing system, via automatic corrective actions and/or sending wired or wireless notifications to a system administrator.

20. The method of claim 19, the method further comprising, during a training period:
    obtaining, by one or more processors, multiple application event logs, including those that correspond and do not correspond to the previous system outage;
    determining, by the one or more processors, the one or more first characteristics of the first application event log that corresponds to the previous system outage;
    determining, by the one or more processors, the one or more second characteristics of the second application event log that does not correspond to the previous system outage; and
    storing the first and second application log events and/or the one or more first and second characteristics in a memory unit or data structure for subsequent retrieval and analysis by the one or more processors, wherein the one or more first and second characteristics indicative of whether or not another system outage will occur in the future, respectively, are determined and/or based upon individual terms or specific words in an application event log that is associated with the previous system outage.

* * * * *